July 29, 1969

H. W. KASEMIR 3,458,805

ELECTRIC FIELD METER HAVING A PAIR OF ROTATING
ELECTRODES FOR MEASURING THE STRENGTH AND
DIRECTION OF AN ELECTRIC FIELD

Filed Nov. 4, 1965

INVENTOR,
HEINZ W. KASEMIR

BY Harry M. Saragovitz
Edward J. Kelly, Herbert Berl
& Julian C. Keppler
ATTORNEYS July 29, 1969

H. W. KASEMIR 3,458,805

ELECTRIC FIELD METER HAVING A PAIR OF ROTATING
ELECTRODES FOR MEASURING THE STRENGTH AND
DIRECTION OF AN ELECTRIC FIELD

Filed Nov. 4, 1965

INVENTOR,
HEINZ W. KASEMIR

BY Harry M. Saragovitz,
Edward J. Kelly, Herbert Berl
& Julian C. Keppler

ATTORNEYS

United States Patent Office 3,458,805
Patented July 29, 1969

3,458,805
ELECTRIC FIELD METER HAVING A PAIR OF ROTATING ELECTRODES FOR MEASURING THE STRENGTH AND DIRECTION OF AN ELECTRIC FIELD
Heinz W. Kasemir, Neptune, N.J., assignor to the United States of America as represented by the Secretary of the Army
Filed Nov. 4, 1965, Ser. No. 506,911
Int. Cl. G01r 29/08, 5/28
U.S. Cl. 324—72    2 Claims

ABSTRACT OF THE DISCLOSURE

A pair of rotating electrodes insulated from each other are connected to the input of a balanced amplifier. The output of the amplifier is connected to a pair of slip rings. A brush in contact with one slip ring provides a continuous wave output of the voltage developed across the electrodes. The other slip ring is in contact with four brushes mounted in space quadrature. Each brush provides periodic samples of the electrode voltage difference. These samples are added vectorially giving both the magnitude and direction of the electric field in the plane of rotation of the electrodes.

---

The United States Government is granted a nonexclusive, irrevocable, royalty-free license, with power to grant sub-licenses for all governmental purposes in the invention described herein.

The present invention relates to a directional electric field meter and more particularly to a device for measuring the magnitude and direction of electric fields in a given plane.

In the field of meteorology, it has been the general practice to employ electric field meters for detecting the approach, presence, or withdrawal of thunder storms and the like. Those concerned with the development of field meters have long recognized the need for improving the sensitivity of such devices which is usually jeopardized by noise due to contact potentials, self-charges, and the effects of weather precipitation such as rain, snow, sleet, etc. The present invention fulfills this need.

It is, therefore, the primary object of the present invention to provide a highly sensitive electric field meter.

The exact nature of this invention as well as other objects and advantages thereof will be readily apparent from consideration of the following specification relating to the annexed drawings, in which—

Figure 1:
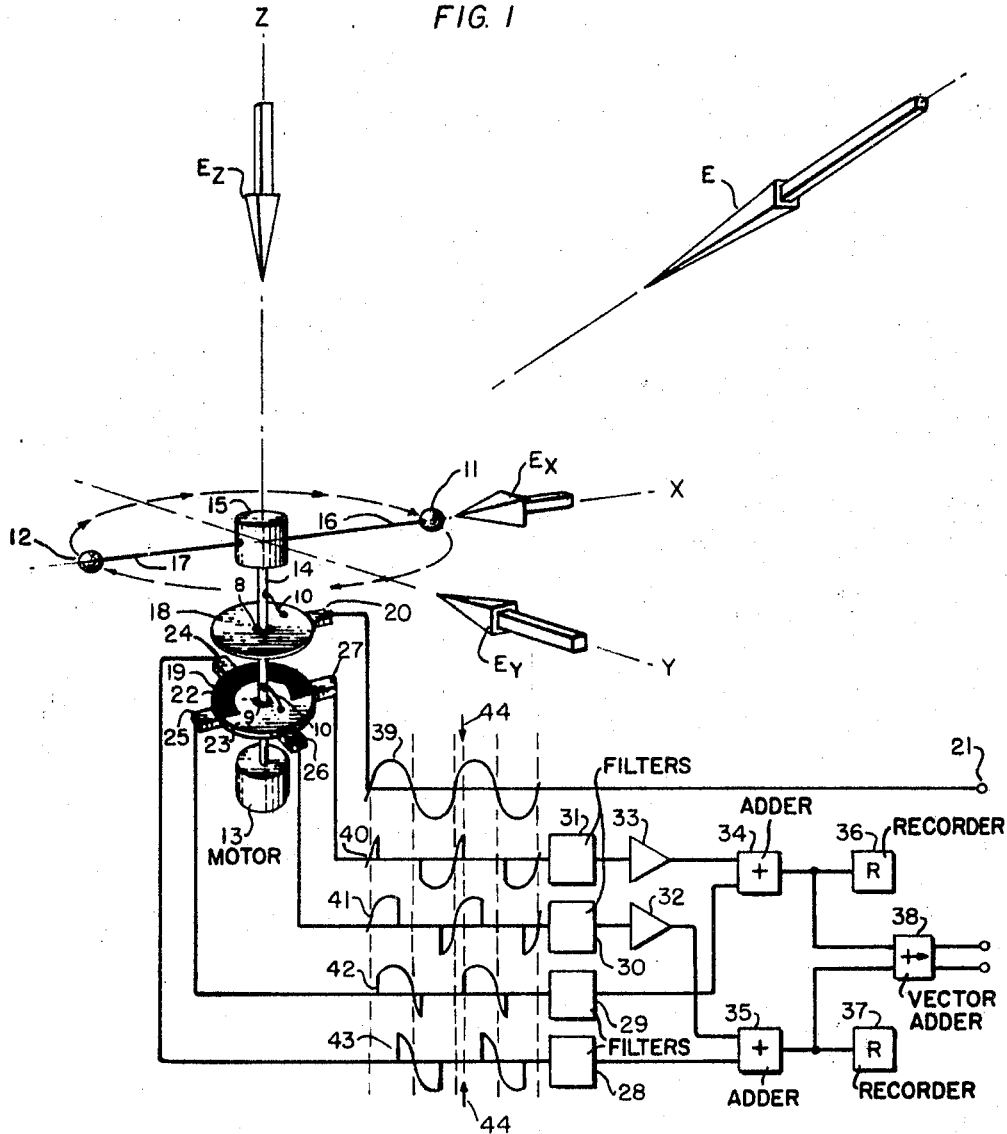
FIG. 1 represents a schematic diagram of a preferred embodiment of the present invention.

Referring now to the drawings, wherein like reference characters designate like or corresponding parts throughout the several views there is shown in FIG. 1 (which illustrates a preferred embodiment) a pair of conductive electrodes 11 and 12 insulated from each other and mounted in an electrostatic field the magnitude and direction of which is represented by the vector E. This vector may be resolved into three orthogonal components along the X, Y, and Z axes of a rectangular coordinate system such as shown in FIG. 1. The three vector components are shown as $E_x$, $E_y$, and $E_z$. The X, Y, and Z axes are drawn for purposes of illustration in FIG. 1, such that the electrodes 11 and 12 lie on the X axis and are spaced equally on opposite sides of the Z axis.

A motor 13 is provided for rotating the electrodes 11 and 12 in the X–Y plane about the Z axis. A shaft 14 is connected between the motor 13 and an amplifier housing 15. Housing 15 in turn carries two suporting arms 16 and 17 for mounting the electrodes 11 and 12 respectively. Amplifier housing 15 houses a typical balanced amplifier circuit and arms 16 and 17 besides being mechanical mounts may also be used as electrical connections from the electrodes to the inputs of the balanced amplifier. A pair of slip rings 18 and 19 are supported by shaft 14 for rotation therewith. Slip rings 18 and 19 are insulated from shaft 14 by insulating collars 8 and 9 respectively. Slip ring 18 is entirely conductive and makes a good electrical connection with brush 20 which in turn is connected to a terminal 21. Slip ring 19 is split into two sections 22 and 23. Section 23 is conductive and section 22 is made of insulating material. A conductor 10 is connected from the output of the balanced amplifier in housing 15 through shaft 14 to slip ring 18 and to section 23 of slip ring 19. Four brushes 24–27 are mounted in contact with ring 19 and are spaced at 90° intervals about the ring 19. The spacing of the brushes 24–27 is arbitrary and the orientation of the split in slip ring 19 with respect to the electrodes 11 and 12 is arbitrary. However, for purposes of this discussion the split in slip ring 19 is shown parallel to arms 16 and 17, and brushes 25 and 27 are mounted on opposite sides of ring 19 and lie in the X–Z plane. Brushes 24 and 26 which are also mounted on opposite sides of the slip ring 19 and are spaced 90° from brushes 25 and 27, lie in the Y–Z plane.

Brushes 24, 25, 26, and 27 are connected to low pass filters 28, 29, 30 and 31 respectively. The outputs of filters 30 and 31 are connected to inverters 32 and 33 respectively. The outputs of inverter 33 and filter 29 are connected to the adder circuit 34, and the outputs of inverter 32 and filter 28 are connected to the adder circuit 35. The outputs of adders 34 and 35 are connected to recorders 36 and 37 respectively and may also be connected to a vector adder 38. A shield (not shown) should be provided to shield all of the elements except electrodes 11 and 12 from the electric field E.

The operation of the device shown in FIG. 1 will now be described. The motor 13 is energized and the shaft 14 rotates the slip rings 18 and 19, the housing 15, and the electrodes 11 and 12. A surface charge is induced on electrodes 11 and 12 by the electric field E. The magnitude of this surface charge will depend on the location of the electrodes 11 and 12 in the field E and will be directly proportional to the field strength. Since electrodes 11 and 12 are spaced from each other as they rotate, these electrodes will assume different surface charges if there is an electric field component directed along a line passing through the electrodes 11 and 12. For example, since in FIG. 1 electrodes 11 and 12 lie on the X axis, there will be a difference in surface charge between electrodes 11 and 12 which is directly proportional to the electric field component $E_x$. However, component $E_y$ will induce equal surface charges on both electrodes 11 and 12 as will component $E_z$ (assuming, of course, a homogeneous field). This difference in surface charge induced by component $E_x$ can now be measured as a voltage difference between electrodes 11 and 12. As the electrodes rotate the difference in surface charge or voltage difference between electrodes 11 and 12 will vary in a sinusoidal fashion (again assuming a homogeneous field). Since the electrodes 11 and 12 are rotating about the Z axis, there will be no difference in surface charge induced on electrodes 11 and 12 by the component $E_z$.

The alternating change in the difference voltage induced on the rotating electrodes 11 and 12 may now be amplified and recorded. In FIG. 1 the electrodes 11 and 12 are used to drive the balanced amplifier housed in housing 15. The output of the amplifier is coupled to slip rings 18 and 19 by conductor 10. The amplifier is located before the slip rings 18 and 19 so that any noise which may be generated by the slip rings 18 and 19 will not be amplified and will therefore be negligible. Terminal 21 which is coupled to ring 18 will therefore assume a voltage of the form shown by wave 39 which is superimposed on the associated conductor. Brushes 24, 25, 26, and 27 will sample 180° portions of the amplifier output with a 90° phase shift. Therefore, the waveforms 40, 41, 42, and 43 will be applied to the inputs of filters 28, 29, 30 and 31 respectively. The arrows 44 indicate the time for the position of the electrodes 11 and 12 as shown in FIG. 1 and the waveforms 39–43 are shown for two complete revolutions of electrodes 11 and 12.

The waveforms 40–43 are applied to filters 28–31 respectively which will have DC outputs of a polarity and magnitude equal to the DC component of the particular signal applied thereto. If there is no zero drift in the balanced amplifier, the output of filters 28 and 29 should be equal in magnitude and opposite in polarity to the outputs of filters 30 and 31 respectively. The outputs of filters 30 and 31 are therefore inverted in inverters 32 and 33 respectively and combined with the outputs of filters 28 and 29 in adders 35 and 34 respectively. If the balanced amplifier does have some zero drift, errors introduced in waveforms 40–43 will be cancelled in the adders 34 and 35. The amplitude of the outputs of adders 34 and 35 will be directly proportional to the field strength in the particular directions dictated by the relative angular position of the slip ring 19 with respect to the electrodes 11 and 12, and the relative position of the brushes 24–27 about the ring 19. In FIG. 1, since the brushes are spaced 90° part, the outputs from adders 34 and 35 represent the field strength in two orthogonal directions. Also since the split in slip ring 19 is parallel to arms 16 and 17, and since brushes 24 and 26 lie in the Y–Z plane, the output from adder 35 will represent the magnitude of the field strength in the direction of the X axis. Likewise, the output from adder 34 will represent the magnitude of the field strength in the direction of the Y axis. Of course, the field strength in any two other directions which may or may not be orthogonal to each other may be determined simply by rotating the brushes 24–27 and ring 19 with respect to each other and with respect to electrodes 11 and 12.

The values of the two components may now be recorded in recorders 36 and 37 for analysis. The resultant of vectors $E_x$ and $E_y$ may be computed in vector adder 38 which will give the resultant magnitude and direction at the output thereof.

Figure 2:
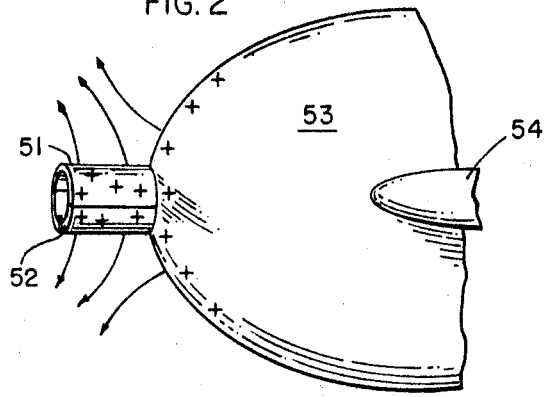
FIGS. 2 and 3 are diagrammatic views showing the field meter mounted on the nose of an airplane.
Figure 3:
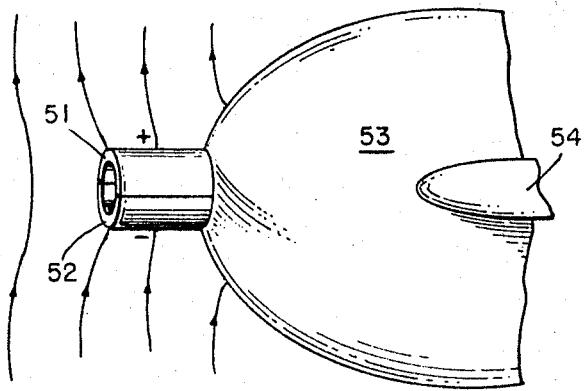

This type of electric field meter is ideally suited for use on airborne carriers such as airplanes and the like. FIGS. 2 and 3 show two semicylindrical electrodes 51 and 52 insulated from each other and mounted on the nose of an aircraft 53 for rotation about a common axis. The wings of the aircraft are designated 54. There are no limitations on the shape of the electrodes shown in FIG. 1, except that the shape and spacing remain constant. For dynamic and structural reasons the two semicylindrical shaped electrodes are best suited for use on aircraft and are therefore illustrated here. It is also pointed out that with this configuration the remaining equipment can be mounted in the aircraft or in the cylinder formed by electrodes 51 and 52. Therefore, with a conductive cover placed over the ends of electrodes 51 and 52 and insulated therefrom the auxiliary equipment would be shielded. The field meter is shown mounted on the nose of the aircraft 53 because of its rotational symmetry. Other portions of the aircraft such as the belly may also be used. It is well-known that an aircraft will become charged as a result of the exhaust fumes being discharged therefrom. This charge, which is shown positive will be distributed as shown in FIG. 2 on the exterior of the fuselage, wings, etc. in proportion to the shape thereof. In fact, some of this charge will leak up through the grounded side of the amplifier (shaft 14) to the electrodes 51 and 52 as is also shown in FIG. 2. An electric field will then be set up between the aircraft and electrodes and some exterior charge in the manner shown by the electric lines in FIG. 2. However, since this field due to the self-charge is symmetrical about the electrodes 51 and 52, equal surface charges will be induced on both electrodes 51 and 52 even as they rotate. Therefore, the useful output from electrodes 51 and 52 will not be affected by this self-charge.

It is also well-known that field meters in the past have been plagued by noise due to contact potentials which are modulated as a result of changes in the capacitance between the electrodes and other conductive surfaces. The field meter of the present invention when mounted on an aircraft as shown in FIG. 2 will, of course, have some contact potential between the electrodes and the aircraft. However, again because of the rotational symmetry of the field meter and the aircraft nose, surface charges on the electrodes 51 and 52, which are a result of contact potentials, remain constant and will not modulate wave 39 as the electrodes 51 and 52 rotate. It is further pointed out that there is no shutter or other conductive surface which moves in close proximity to electrodes 51 and 52. Therefore, precipitation such as rain, sleet, etc. will not produce noise due to short circuits.

The device of FIG. 1 is also well suited for use on aircraft and the like because it automatically determines two orthogonal components of a field in a given plane. The electric lines in FIG. 3 represent that portion of the influence field (field to be measured) which lies in the plane of the paper. The influence field, assumed to be originally homogeneous, may be distorted by the aircraft 53 in the manner shown in FIG. 3. The amount of distortion will depend on the geometry of the aircraft. It is well known that for a particular aircraft and field meter a distortion factor, which will remain constant for all field components in a particular direction, can be determined from a model placed in a known electric field. The distortion factor for fields in the plane of the paper in FIG. 3 will be different for fields directed perpendicular to the plane of the paper, because the wings 54 will weaken and distort the latter field more than the former. Therefore, since the distortion factors remain constant for a given direction and can be easily measured, and are usually different from different directions, the device of FIG. 1, which measures the field in two predetermined directions which are different, can have each output channel calibrated separately and the distortion factor compensated by the appropriate amount of amplification at the recorders 36 and 37.

Figure 4:
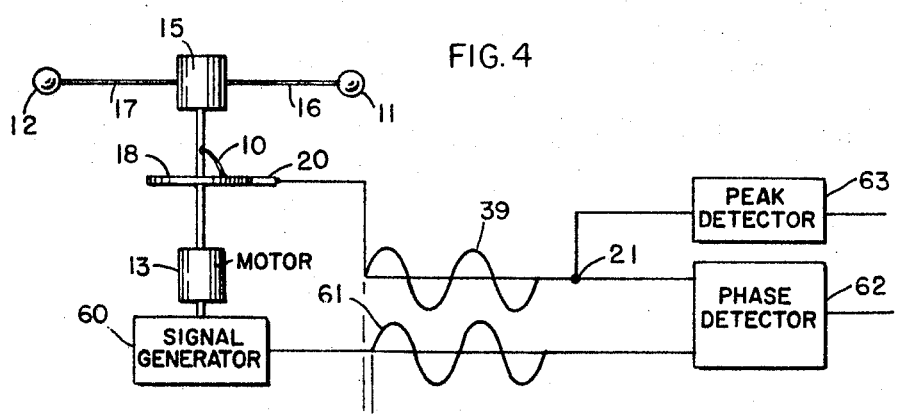
FIG. 4 represents a schematic diagram of another form of the invention.

A modification of the device of FIG. 1 can be used when the distortion factors in all directions are equal. For example, if the field meter were to be placed on the top of a tall symmetrical mast, the device of FIG. 4 could be employed and the electric field magnitude and direction in the plane of rotation of the electrodes would be determined directly. FIG. 4 shows the same field meter rotor as shown in FIG. 1 except that slip ring 19 is removed. Motor 13 operates a signal generator 60 which produces a time varying wave such as sine wave 61 which has the same frequency as the frequency of rotation of the electrodes 11 and 12. Terminal 21, which was merely used for reference in the device of FIG. 1, and the output of signal generator 60 are connected to a phase detector 62. The phase of signal 39 with respect to signal 61 will be a measure of the angular direction of the field in the X–Y plane. The peak amplitude of signal 39 will be a measure of the magnitude of the field in the X–Y plane. Therefore, terminal 21 is also connected to a peak detector 63 which will have an output proportional to the field strength in the X–Y plane, i.e., the vector resultant of $E_x$ plus $E_y$ in FIG. 1, In the above discussion waveforms 39–43 were referred to as voltage waveforms simply for matters of convenience. It is to be understood, of course, that current flow to and from electrodes 11 and 12, which is simply a function of voltage, could also have been measured and shown in FIGS. 1 and 4. It is therefore to be understood that there is to be no difference in interpreting the terms "current flow" and "voltage difference" and that the latter term is used only for convenience. The electrodes 11 and 12, which are shown as spheres for convenience, may assume any desired shape. It is necessary, however, that the shapes and spacing of the electrodes from each other remain constant while the voltages or currents on electrodes, 11 and 12 are being sampled or measured. In this way the capacitance between electrodes 11 and 12 will be the same for all waveform samples and the voltage difference will be only a function of the electric field E. It is also pointed out that the Z component of the field and therefore the magnitude and direction of the total electric field E can be determined by simply mounting a second field meter such that the axes of rotation thereof is at an angle (preferably 90°) to the first field meter. It is further pointed out that the spacing between the pair of brushes 24, 26 and the pair 25, 27 determines the angle between the vector components measured. In the rectangular coordinates of FIG. 1 the spacing is 90° as shown. It is also possible to measure the vector components in any desired non-rectangular coordinate system by adjusting the brushes 24–27 correspondingly.

Obviously, many modifications, variations, and uses of the present invention are possible in the light of the above teachings. It is therefore to be understood, that within the scope of the appended claims, the invention may be practiced otherwise than as specifically described.

What is claimed is:

1. An electric field meter comprising first and second electrodes spaced on opposite sides of an axis of rotation and insulated from each other; motor means connected to said electrodes for rotating said electrodes about said axis; swtiching means for sampling the amplitude of the voltage difference between said electrodes at four predetermined, equally spaced, rotational positions during each complete revolution of said electrodes; meter means connected to said switching means for measuring the amplitude of said voltage difference at each of said four positions; said meter means comprising four measuring channels; said switching means including means for taking each said sample for periods of half a revolution of said electrodes and for feeding each said electrode with a different one of said samples; and each said channel including means for measuring the D-C component of the sample applied thereto.

2. An electric field meter comprising first and second electrodes spaced on opposite sides of an axis of rotation and insulated from each other; motor means for rotating said electrodes about said axis; said electrodes being connected to the inputs of a balanced amplifier; the output of said balanced amplifier being connected to a switching means; said motor means controlling said switching means for connecting successively the output of said balanced amplifier to four channels for predetermined periods during each complete revoltuion of said electrodes; each said channel including filter means for measuring the D-C component of the signal applied thereto; and said switching means including means for connecting a different one of said channel to the output of said balanced amplifier at every quarter revolution of said electrodes and remaining connected for a period of a half revolution of said electrodes.

References Cited

UNITED STATES PATENTS 3,253,207   5/1966   Jauch _____ 324—72 XR

OTHER REFERENCES

Physical Review, "Principles of a New Portable Electrometer" (Ross Gunn), vol. 40, Apr. 15, 1932, pp. 307–312.

RUDOLPH V. ROLINEC, Primary Examiner

E. L. STOLARUN, Assistant Examiner

U.S. Cl. X.R.

324—32